United States Patent
Choi et al.

(10) Patent No.: US 10,119,832 B2
(45) Date of Patent: Nov. 6, 2018

(54) CHARGING STATION GUIDE APPARATUS AND METHOD OF THE SAME

(71) Applicant: HYUNDAI MOTOR COMPANY, Seoul (KR)

(72) Inventors: Hye Jin Choi, Suwon-si (KR); Sang Yeon Lim, Seongnam-si (KR); Jake Gin, Seongnam-si (KR); Yeonji Kim, Seoul (KR); Yongho Lee, Hwaseong-si (KR); Jeong Won Lee, Suwon-si (KR); Hyun Seung Yang, Seongnam-si (KR); Sungtae Cho, Uiwang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/363,755

(22) Filed: Nov. 29, 2016

(65) Prior Publication Data

US 2017/0299401 A1 Oct. 19, 2017

(30) Foreign Application Priority Data

Apr. 19, 2016 (KR) .................. 10-2016-0047693

(51) Int. Cl.
*G01C 21/36* (2006.01)
*G01C 21/34* (2006.01)
(Continued)

(52) U.S. Cl.
CPC .......... *G01C 21/3682* (2013.01); *B60L 11/00* (2013.01); *G01C 21/3469* (2013.01); *G01S 19/14* (2013.01); *G01S 19/51* (2013.01)

(58) Field of Classification Search
CPC . G01C 21/3682; G01C 21/3469; G01S 19/14; G01S 19/51
See application file for complete search history.

(56) References Cited

U.S. PATENT DOCUMENTS

2012/0019204 A1* 1/2012 Matsuo .................. B60L 3/12
320/109
2012/0150436 A1 6/2012 Rossano et al.
(Continued)

FOREIGN PATENT DOCUMENTS

EP 2734811 B1 7/2015
JP H08-055298 A 2/1996
(Continued)

*Primary Examiner* — Basil T. Jos
(74) *Attorney, Agent, or Firm* — Brinks Gilson & Lione

(57) ABSTRACT

The present disclosure provides charging station guide apparatus and method. The charging station guide apparatus includes: a global positioning system (GPS) receiving a GPS signal transmitted from a GPS satellite; a storage unit storing charging station information including map information and charging station position information; a control unit generating a first display window including a vehicle object representing vehicle position information and a charging station position object representing charging station position information based on the GPS signal, the map information, and the charging station information, generating a second display window including a charging station distance object representing charging station distance information, and also generating an image so that the second display window overlaps with one end of the first display window; and a display unit displaying an image generated from the control unit.

18 Claims, 12 Drawing Sheets

(51) Int. Cl.
  *G01S 19/14* (2010.01)
  *G01S 19/51* (2010.01)
  *B60L 11/00* (2006.01)

(56) References Cited

U.S. PATENT DOCUMENTS

2014/0156108 A1    6/2014  Reich
2015/0051763 A1*   2/2015  Enomoto ............ B60L 11/1862
                                              701/22

FOREIGN PATENT DOCUMENTS

| | | |
|---|---|---|
| JP | 2003-148972 A | 5/2003 |
| JP | 2005-055201 A | 3/2005 |
| JP | 2010-286400 A | 12/2010 |
| KR | 10-2004-0023352 A | 3/2004 |
| KR | 10-2005-0082358 A | 8/2005 |
| KR | 10-2011-0051348 A | 5/2011 |
| KR | 10-2012-0061107 A | 6/2012 |
| KR | 10-2012-0061291 A | 6/2012 |
| KR | 10-2012-0099977 A | 9/2012 |
| KR | 10-2015-0070208 A | 6/2015 |

* cited by examiner

CHARGING STATION GUIDE APPARATUS AND METHOD OF THE SAME

CROSS-REFERENCE TO RELATED APPLICATION

This application claims priority to and the benefit of Korean Patent Application No. 10-2016-0047693 filed on Apr. 19, 2016, the entire contents of which are incorporated herein by reference.

FIELD

The present disclosure relates to a charging station guide apparatus, and a method capable of providing charging station information.

BACKGROUND

The statements in this section merely provide background information related to the present disclosure and may not constitute prior art.

As a global environmental pollution problem becomes serious, the use of clean energy is getting more important. In particular, air pollution problem of metropolis is getting more serious. One of the causes is the exhaust gas of a vehicle.

To address the problem of the exhaust gas and improve fuel efficiency, green vehicles including a hybrid vehicle, an electric vehicle, and a hydrogen vehicle have been developed.

The electric vehicle includes a battery as a driving power source and is driven by a driving motor using the battery as the power source. Electricity is generated by the driving motor upon regenerative braking while the electric vehicle is driven, and therefore the battery may be charged. However, the battery is discharged beyond the charged amount while the vehicle is driven, and therefore the battery needs to be charged if the vehicle exceeds a predetermined distance and time.

As the electric vehicle is commercialized, a plug-in type in which the battery is directly charged in limited spaces such as home and research institutes has been introduced.

Infrastructure of the charging station for the green vehicles including the electric vehicle and the hydrogen vehicle is not still completely prepared, and therefore a driver of the green vehicles may not find the charging station when the charging is desired. Further, the charging of the electric vehicle takes relatively much more time than time to fill conventional gasoline and diesel vehicles with fuel.

The above information disclosed in this Background section is only for enhancement of understanding of the background of the present disclosure and therefore it may contain information that does not form the prior art that is already known to a person of ordinary skill in the art.

SUMMARY

The present disclosure provides a charging station guide apparatus and method capable of providing information of a charging station based on a driving direction of a vehicle.

An exemplary form of the present disclosure provides a charging station guide apparatus, including: a global positioning system (GPS) configured to receive a GPS signal transmitted from a GPS satellite; a storage unit configured to store charging station information including map information and charging station position information; a control unit configured to generate a first display window including a vehicle object and a charging station position object, and configured to generate a second display window including a charging station distance object representing charging station distance information, the control unit configured to generate an image so that the second display window overlaps with one end of the first display window; and a display unit configured to display an image generated from the control unit. In particular, the vehicle object represents vehicle position information, and the charging station position object represents the charging station position information based on the GPS signal, the map information, and the charging station information.

The control unit may determine a driving direction of the vehicle based on the vehicle position information and the charging station position object may include a first position object representing a charging station positioned in the driving direction and a second position object representing a charging station positioned out of the driving direction.

At least one of sizes, colors, or forms of the first position object and the second position object may be different from each other.

The control unit may set a driving display region within a set angle range with respect to the driving direction and the first display window may further include the driving display region.

If the second position object is selected, the control unit may reset the driving display region to include the second position object.

The control unit may calculate a driving range using fuel amount information and average fuel efficiency and the first display window may further include a driving display region representing the driving range.

The second display window may include a distance display window including a charging station distance object representing the charging station distance information and an altitude display window representing charging station altitude information.

If a change request is input by a driver, the second display window may be changed to the distance display window or the altitude display window.

The distance display window may further include a selection object for selecting the charging station distance object, and if the selection object moves to the charging station distance object, the charging station distance object may be selected.

Fuel of the vehicle may be electricity or hydrogen and the vehicle may be driven by a driving motor using electric energy.

Another form of the present disclosure provides a method for guiding, by a charging station guide apparatus, a charging station, the method including: generating, by a control unit, a first display window including a vehicle object representing vehicle position information and a charging station position object representing charging station position information based on a GPS signal, map information, and charging station information; generating, by the control unit, a second display window including a charging station distance object representing charging station distance information; generating, by the control unit, an image including the first display window and the second display window; and displaying, by a display unit, the image.

The generating of the first display window may include: determining, by the control unit, a driving direction of the vehicle based on the vehicle position information and the charging station position object may include a first position object representing a charging station positioned in the driving direction and a second position object representing a charging station positioned out of the driving direction.

The generating the first display window may further include: setting a driving display region within a set angle range with respect to the driving direction and the first display window may further include the driving display region.

The method may further include resetting the driving display region to include the second position object, when the second position object is selected.

The generating the first display window may include: calculating a driving range using fuel amount information and average fuel efficiency and the first display window may further include a driving display region representing the driving range.

The second display window may include a distance display window including a charging station distance object representing the charging station distance information and an altitude display window representing charging station altitude information.

The distance display window may further include a selection object for selecting the charging station distance object and if the selection object moves to the charging station distance object, the charging station distance object may be selected.

A scale of the distance information of the second display window may be changed depending on charging station setting number information or a driving range.

If a change request is input by a driver, the second display window may be changed to the distance display window or the altitude display window.

In the generated image, a second display window may overlap with one end of the first display window.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
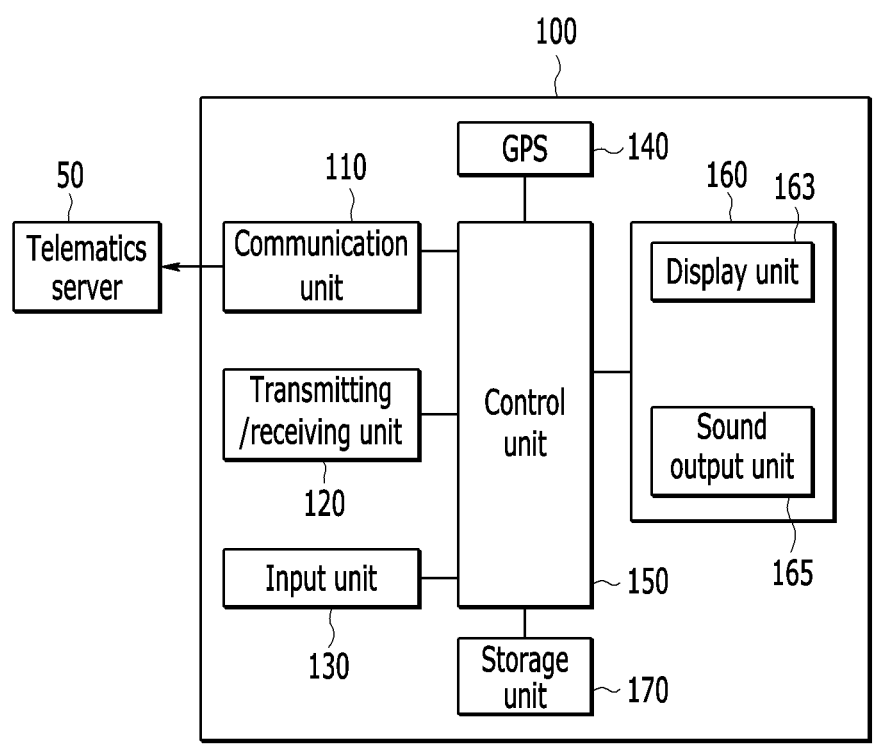
FIG. 1 is a diagram illustrating a charging station guide apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, charging station guide apparatus and method according to an exemplary form of the present disclosure will be described with reference to the accompanying drawings. Therefore, the present disclosure is not limited to only the following drawings and the description.

Further, in describing exemplary forms of the present disclosure, well-known functions or constructions will not be described in detail since they may unnecessarily obscure the understanding of the present disclosure. Further, the following terminologies are defined in consideration of the functions in the present disclosure and may be construed in different ways by the intention of users and operators, practice or the like. Therefore, the definitions thereof should be construed based on the contents throughout the present disclosure.

Further, for efficiently describing the technical core features of the present disclosure, terms will be appropriately changed, integrated, or separately used in the following exemplary forms to be clearly understood by those skilled in the art but the present disclosure is never limited thereto.

FIG. 1 is a diagram illustrating a charging station guide apparatus according to an exemplary form of the present disclosure.

A charging station guide apparatus 100 may be mounted in an electric vehicle or a fuel cell vehicle (hereinafter, referred to as a vehicle) that uses electricity or hydrogen as fuel. That is, the charging station guide apparatus 100 may be mounted in a vehicle driven by a driving motor powered by electric energy.

The charging station guide apparatus 100 may provide a position guide of a charging station, a route guide to a destination, or the like. The charging station guide apparatus 100 may be installed inside a vehicle or may be in the form of a separate apparatus. The charging station guide apparatus 100 may be different forms adaptive to provide a driver with the position guide of the charging station, the route guide to the charging station, or the like. For example, the charging station guide apparatus 100 may be any one of a mobile communication terminal, a mobile computer such as a tablet PC, a laptop, and a netbook, an audio-video-navigation (AVN), or the like.

As illustrated in FIG. 1, the charging station guide apparatus 100 includes a communication unit 110, a transmitting and receiving unit 120, an input unit 130, a global positioning system (GPS) 140, a control unit 150, an output unit 160, and a storage unit 170.

The communication unit 110 is connected to an external server through a wireless communication network to guide a charging station to a driver. The communication unit 110 may transmit or receive data to or from a telematics server 50 that is installed in a telematics center through the wireless communication network. The communication unit 110 may transmit a current position of a vehicle to the telematics server 50. Further, the communication unit 110 may receive at least one of map information, road information, traffic information, weather information, and charging station information from the telematics server 50. The charging station information is information for identifying a charging station and may include charging station name information, charging station position information, charging station altitude information, oil price information, or the like.

The transmitting and receiving unit 120 receives vehicle state information through intra-vehicle communication. In this case, the intra-vehicle communication may be controller area network (CAN) communication or short range wireless communication. The short range wireless communication may be at least one of Bluetooth, infrared data association (IrDA), WiFi, a wireless LAN, a radio frequency (RF), near field communication (NFC), and ZigBee.

The vehicle state information is information of the current state of the vehicle and may include energy or fuel amount information, vehicle speed information, or the like. Here, the fuel or energy amount information may represent a currently remaining amount of fuel or energy (e.g., electricity or hydrogen) of a vehicle and the vehicle speed information may represent a current speed of a vehicle.

The input unit 130 is a user interface (UI) for receiving various data from a driver. The input unit 130 receives a control command, a function selection command, or the like for controlling an operation of the charging station guide apparatus 100 from a driver. The input unit 130 may be configured of a touch pad, a key pad, a button, a switch, or the like. In particular, when the touch pad and a display unit 163, which will be described below, form a layer structure, the touch pad may be called a touch screen. The input unit 130 may receive one of a plurality of charging stations displayed on the display unit 163.

The GPS 140 receives a GPS signal transmitted from a GPS satellite. The GPS 140 provides the GPS signal to the control unit 150. The control unit 150 may calculate the current position of the vehicle, the current speed of the vehicle, or the like based on the GPS signal. Further, the control unit 150 may generate charging station distance information on a distance from the current position of the vehicle to a charging station based on the current position of the vehicle and the charging station position information.

The control unit 150 controls the communication unit 110, the transmitting and receiving unit 120, the input unit 130, the GPS 140, the output unit 160, and the storage unit 170. The control unit 150 generates a first display window including a vehicle object and a charging station position object based on the map information and the charging station information. The object means information which may be selected by the input of the driver and controlled according to a driver's intention. For example, the object may include an icon, a text, a content, a list, or the like. In particular, the vehicle object may represent the vehicle position information, and the charging station position object may represent the charging station position information.

The control unit 150 generates a second display window including a charging station distance object and a charging station altitude object based on the charging station distance information and the charging station altitude information. Here, the charging station distance object may represent the charging station distance information and the charging station altitude object may represent the charging station altitude information.

The control unit 150 generates an image including the first display window and the second display window.

The control unit 150 may be implemented by at least one microprocessor operated by a predetermined program, in which the predetermined program may include a series of commands for executing each step included in the charging station guide method to be described below. The charging station guide method will be described in more detail with reference to FIGS. 2 to 9.

The output unit 160 generates an output associated with visual sense, hearing sense, or the like and includes the display unit 163 and a sound output unit 165.

The display unit 163 may display information processed by the charging station guide apparatus 100. The display unit 163 may display an image according to a control of the control unit 150. If the charging station guide apparatus 100 is guiding a route, the display unit 163 may display a user interface (UI) or a graphic user interface (GUI) associated with a route guide. Further, if the charging station guide apparatus 100 is playing a music file, the display unit 163 may display the UI or the GUI associated with a playing function.

The sound output unit 165 outputs a sound signal associated with a function performed by the charging station guide apparatus 100. For example, the sound output unit 165 may output the sound signal associated with a charging station route guide, a destination route guide, or the like. The sound output unit 165 may also output audio data such as the music file requested by a driver.

The storage unit 170 stores data desired for components of the charging station guide apparatus 100 and data generated from the components of the charging station guide apparatus 100. For example, the storage unit 170 may store the map information, the road information, the traffic information, the weather information, and the charging station information. The storage unit 170 may store various programs for controlling the general operation of the charging station guide apparatus 100. The storage unit 170 may provide desired data according to the request of the communication unit 110, the transmitting and receiving unit 120, the input unit 130, the GPS 140, the control unit 150, and the output unit 160. Further, the storage unit 170 may be configured of an integrated memory or may be subdivided into a plurality of memories and configured of the memories. For example, the storage unit 170 may be in the form of a read only memory (ROM), a random access memory (RAM), a flash memory, or the like.

Meanwhile, the exemplary form of the present disclosure describes, for example, receiving the map information, the charging station information, or the like through the communication unit 110, but is not limited thereto. Therefore, a charging station may be guided based on the information stored in the storage unit 170. For example, when the communication unit 110 and the wireless communication network get out of order, the wireless communication is not used, or the communication unit 110 is not present in the charging station guide apparatus 100, the control unit 150 may also guide a charging station using the map information, the charging station information, or the like that are stored in the storage unit 170.

Hereinafter, a charging station guide method according to the exemplary form of the present disclosure will be described with reference to FIGS. 2 to 9.

Figure 2:
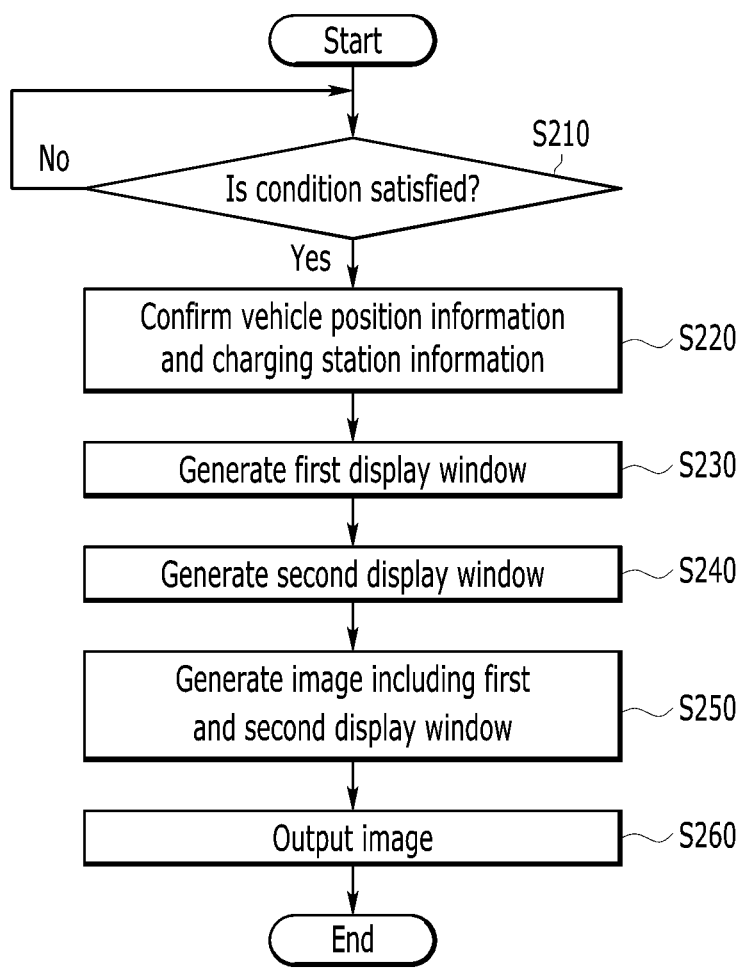
FIG. 2 is a flow chart illustrating a charging station guide method.
Figure 3:
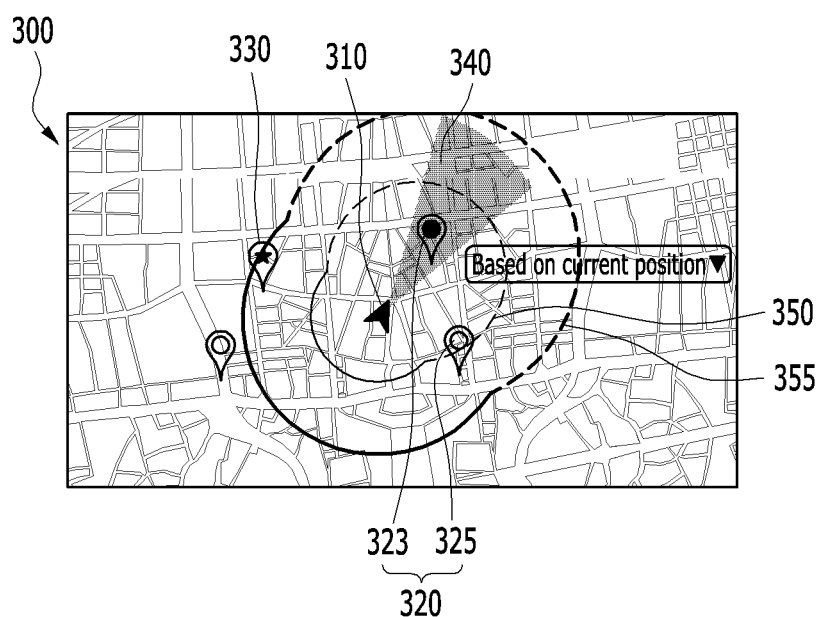
FIG. 3 is an exemplified diagram illustrating a first display window.
Figure 4A:
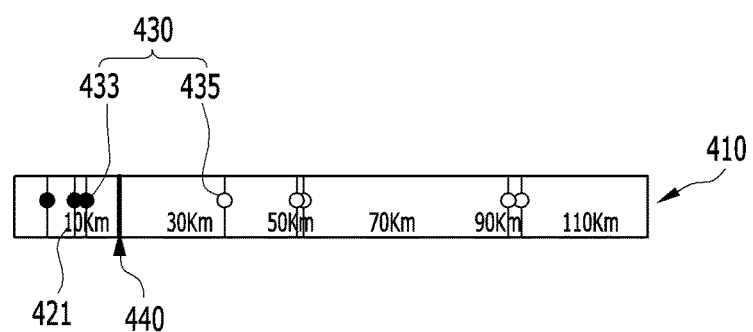
FIGS. 4A and 4B are exemplified diagrams illustrating a second display window.
Figure 4B:
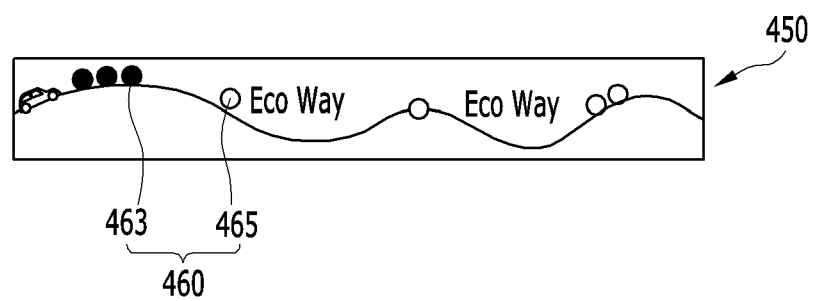
Figure 5:
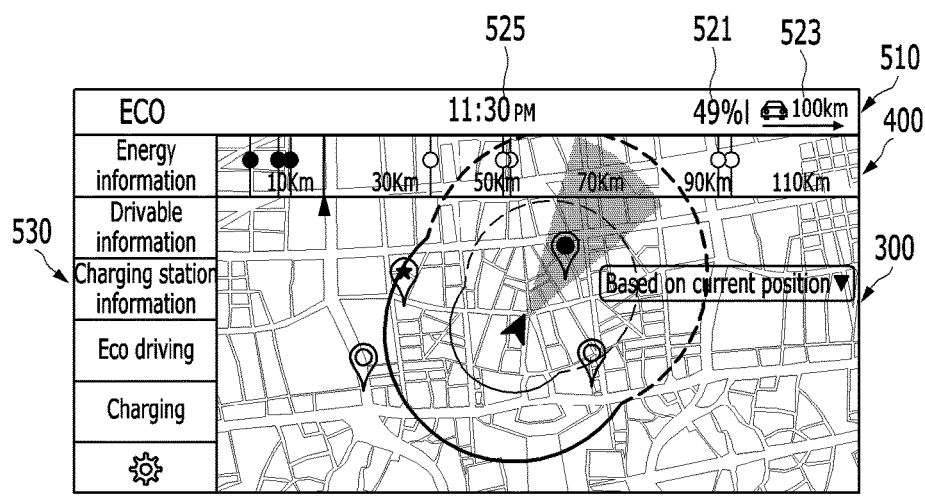
FIG. 5 is an exemplified image of information displayed.

FIG. 2 is a flow chart illustrating a charging station guide method, FIG. 3 is an exemplified diagram illustrating a first display window, FIGS. 4A and 4B are exemplified diagrams illustrating a second display window, and FIG. 5 is an exemplified diagram illustrating an image according to an exemplary form of the present disclosure.

Referring to FIG. 2, the control unit 150 determines whether a condition for guiding a charging station is satisfied (S210). The control unit 150 determines whether a driver requests the charging station information through the input unit 130. Further, the control unit 150 determines whether a fuel (e.g., electricity or hydrogen) amount is equal to or less than a setup value or a driving range is equal to or less than a setup value. In this case, the driving range represents a driving range of the vehicle based on fuel of a vehicle and may be calculated based on average fuel efficiency. The setup value is a value that is referenced to determine when fuel charging is desired and may be set by a manager or set by predetermined algorithm (for example, program and probability model).

If the control unit 150 does not satisfy the condition for guiding the charging station, the control unit 150 again returns to S210 to monitor the condition for guiding the charging station.

If the control unit 150 satisfies the condition for guiding the charging station, the control unit 150 confirms the vehicle position information and the charging station information (S220). More specifically, the control unit 150 confirms the vehicle position information and the charging station information if a driver requests a charging station guide, or fuel amout or the driving range is equal to or less than the setup value. In this case, the vehicle position information and the charging station information may be the information received from the telematics server 50 through the communication unit 110 or may be the information stored in the storage unit 170.

Further, the control unit 150 may also determine the vehicle position information based on the GPS signal. The vehicle position information may represent the information on the current position of the vehicle. The charging station information is the information for identifying a charging station and may include the charging station name information, the charging station position information, the charging station altitude information, the oil price information, or the like. Here, the charging station altitude information may be information on an altitude at which a charging station is positioned.

The control unit 150 generates the first display window using the map information, the vehicle position information and the charging station information (S230). In detail, the control unit 150 sets the vehicle object representing the vehicle position information and the charging station position object representing the charging station position information included in the charging station information.

In particular, the control unit 150 may extract at least one charging station positioned within a predetermined radius from the vehicle position using the vehicle position information. The control unit 150 may confirm the charging station position information of the extracted charging station and set the charging station position object representing the charging station position information. Here, the charging station position object may further include the charging station name information and the oil price information as well as the charging station position information.

The control unit 150 determines the driving direction of the vehicle based on the vehicle position information. The control unit 150 confirms the charging station position information of the charging station positioned in the driving direction using the charging station information. Further, the control unit 150 confirms the charging station position information of the charging station positioned out of the driving direction using the charging station information.

As illustrated in FIG. 3, a charging station position object 320 includes a first position object 323 representing the charging station positioned in the driving direction and a second position object 325 representing the charging station positioned out of the driving direction. In this case, sizes, forms, colors, or the like of the first position object 323 and the second position object 325, respectively may be different. As such, the reason that the first position object 323 and the second position object 325 are different from each other is to allow a driver to easily identify the charging station positioned in the driving direction and the charging station positioned out of the driving direction.

The control unit 150 generates the first display window 300 including the charging station position object 320. A scale of the map information of the first display window 300 may be automatically adjusted. For example, a scale may be changed to represent the whole route up to the vehicle position and the charging station selected by the driver or a scale may also be changed to display the charging station selected by the driver on the map information.

Further, the control unit 150 may include a bookmark object 330 in the first display window 300. The bookmark object 330 may be an object representing the charging station position information of a charging station directly set by a driver and a charging station selected more than a predetermined frequency by a driver through the charging station position object 320. Here, the predetermined frequency represents a frequency referenced to set a favorite charging station and may be a previously set value.

The control unit 150 determines the driving direction of the vehicle depending on the vehicle position information and sets a driving display region within a set angle range with respect to the driving direction. The control unit 150 generates the first display window 300 including the driving display region 340. For example, the driving display region 340 may have a fan shape as illustrated in FIG. 3.

The control unit 150 determines the driving range and a danger distance using the vehicle position information and the vehicle state information. That is, the control unit 150 may calculate the driving range and the danger distance using the fuel amount information and the average fuel efficiency of the vehicle based on the vehicle position information. Here, the driving range represents an estimated driving distance or area that the vehicle can go based on the current fuel amount and the average fuel efficiency, and the danger distance may be outside of the driving range.

The control unit 150 generates the first display window 300 including a driving display region 350 representing the driving range and a danger display region 355 representing the danger distance.

The first display window 300 includes the charging station position object 320 representing the charging station position information, the driving display region 350 representing the driving range, and the danger display region 355 representing the danger distance, and therefore if the driver confirms only the first display window 300, may confirm whether the vehicle may be driven to the charging station based on the current fuel, thereby improving the driving convenience.

The control unit 150 generates the second display window based on the vehicle position information, the charging station distance information, and the charging station altitude information (S240). In other words, the control unit 150 may confirm the charging station positioned with a predetermined radius based on the vehicle position and generate the charging station distance information on the distance between the vehicle and the charging station.

The control unit 150 generates the distance display window including the charging station distance object that represents the charging station distance information. For example, the control unit 150 may generate a distance display window 410 including a charging station distance object 430 that represents distance information 421 including, for example, 10 km, 30 km, 50 km, 70 km, 90 km, and 110 km and charging station distance information such as 5 km, 9 km, and 10 km, as illustrated in FIG. 4A. In this case, like the charging station position object, the charging station distance object 430 includes a first distance object 433 representing the charging station positioned in the driving direction of the vehicle and a second distance object 435 representing the charging station positioned out of the driving direction of the vehicle.

The distance information of the distance display window has a scale changed depending on charging station setting number information or the driving range. Here, the charging station setting number information may represent the number of charging stations included in the distance display window. When information of too many charging stations is displayed on the distance display window, the driver may not identify the information. Therefore, to inhibit or prevent it, the number of charging stations may be set up. For example, if the driving range is 30 km, a vehicle may be driven only in 30 km with the currently remaining fuel, and therefore a scale may be changed to represent only the charging station positioned within 30 km on the distance display window.

As illustrated in FIG. 4A, the control unit 150 may generate the distance display window 410 to include a selection object 440. Here, the selection object 440 may allow a driver to represent an object for selecting the charging station distance object 430 included in the second display window 410.

For example, a driver may select the selection object 440 and then horizontally drag the selected object 440 to select the charging station distance object 430 representing the charging station position information. Further, if the selection object 440 is positioned near the charging station distance object 430 by the driver, the control unit 150 may automatically move the selection object 440 to the charging station distance object 430 so that the driver easily selects the charging station.

Further, the control unit 150 may confirm the charging station positioned within a predetermined radius with respect to the vehicle position and confirm the charging station altitude information on the charging station.

The control unit 150 generates the altitude display window including the charging station altitude object that represents the charging station altitude information. For example, as illustrated in FIG. 4B, the control unit 150 may generate an altitude display window 450 including the altitude information and the charging station altitude object 460 representing the charging station altitude. In this case, the charging station altitude object 460 includes a first altitude object 463 representing the charging station positioned in the driving direction of the vehicle and a second altitude object 465 representing the charging station positioned out of the driving direction of the vehicle.

The control unit 150 generates the image including the first display window and the second display window (S250). The control unit 150 generates an image so that the second display window overlaps with one end of the first display window.

For example, as illustrated in FIG. 5, the control unit 150 may generate an image 500 so that a second display window 400 overlaps with an upper end of the first display window 300. The image 500 may further include an information display window 510 and a menu display window 530. The information display window 510 may be a display window for informing a driver of a vehicle state and the surrounding situation of the vehicle. The information display window 510 may include at least one of fuel amount information 521, a driving range 523, time information 525, and weather information. The menu display window 530 may be a display window for informing functions that may be provided to a driver.

The control unit 150 controls an output unit 160 to output an image (S260). That is, the display unit 163 may display an image according to the control of the control unit 150 and the sound output unit 165 may output the sound signal depending on the image.

If the driver selects the charging station distance object through the second display window of the image, the control unit 150 may change the first display window to display the charging station corresponding to the charging station distance object selected by the driver on the first display window.

Figure 6:
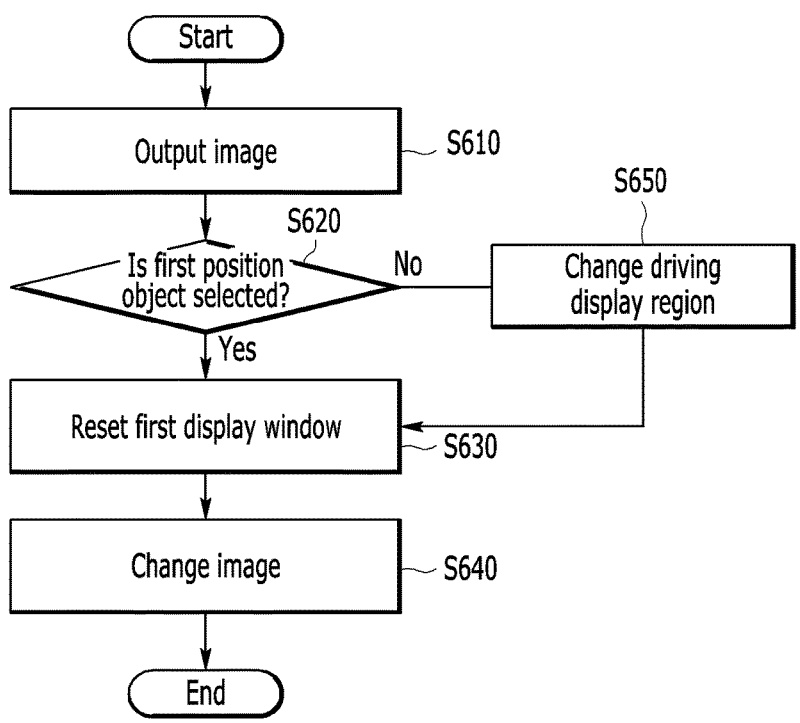
FIG. 6 is a flow chart of selecting a charging station in the charging station guide method.
Figure 7A:
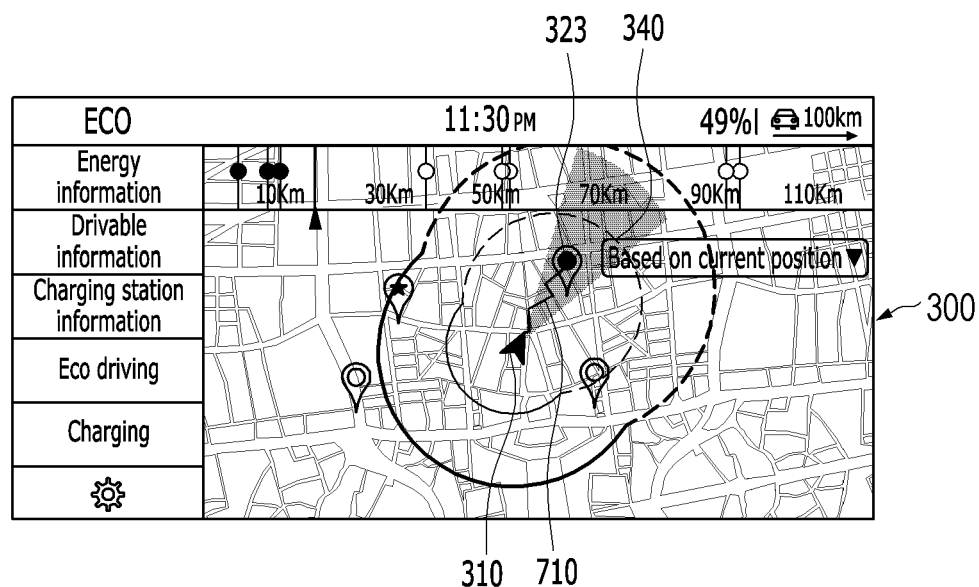
FIGS. 7A and 7B are exemplified diagrams illustrating an image changed by a selection of the charging station.
Figure 7B:
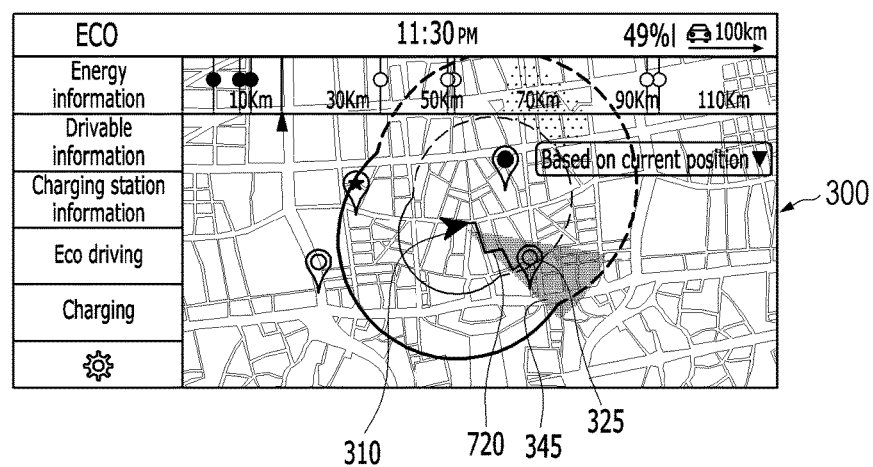

FIG. 6 is a flow chart of selecting a charging station in the charging station guide method and FIGS. 7A and 7B are exemplified diagrams illustrating an image changed by a selection of the charging station.

Referring to FIG. 6, the control unit 150 outputs the image through the output unit 160 (S610). For example, as illustrated in FIG. 7A, the display unit 163 may display the image 500 including the first display window 300 and the second display window 400.

The control unit 150 confirms whether the driver selects the first position object (S620). That is, as illustrated in FIG. 7A, the control unit 150 may confirm whether the driver selects the first position object 323 included in the driving display region 340.

If the driver selects the first position object, the control unit 150 resets the first display window to include the route information up to the charging station selected by the driver (S630). For example, as illustrated in FIG. 7A, the first display window 300 may include route information 710.

The control unit 150 changes and outputs the image to include the first display window reset in step S630 (S640).

If the driver selects the second position object, the control unit 150 changes the driving display region (S650). For example, as illustrated in FIG. 7B, if the driver selects the second position object 325, the driving display region 345 may be changed to include the second position object 325. The control unit 150 resets the first display window to include the route information from the current position of the vehicle to the charging station corresponding to the second position object and outputs the image including the route information. For example, as illustrated in FIG. 7B, the route information 720 may represent a route from the vehicle object 310 to the second position object 325.

Figure 8:
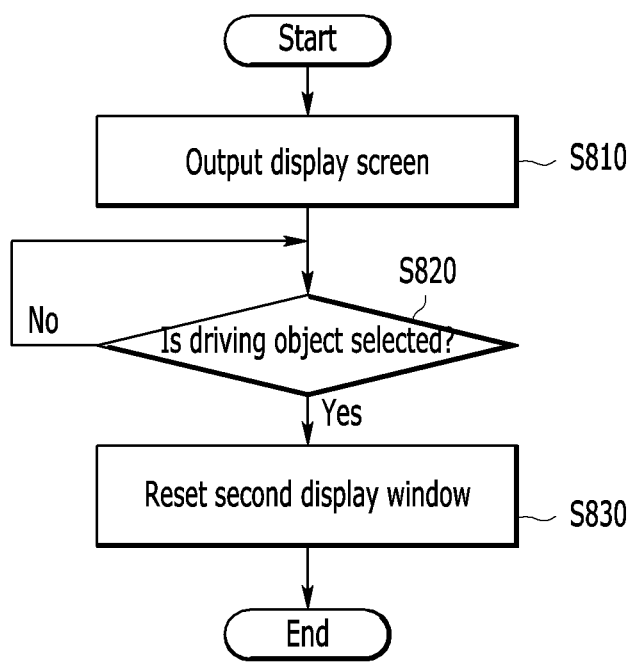
FIG. 8 is a flow chart of a change in a second display window in the charging station guide method.
Figure 9A:
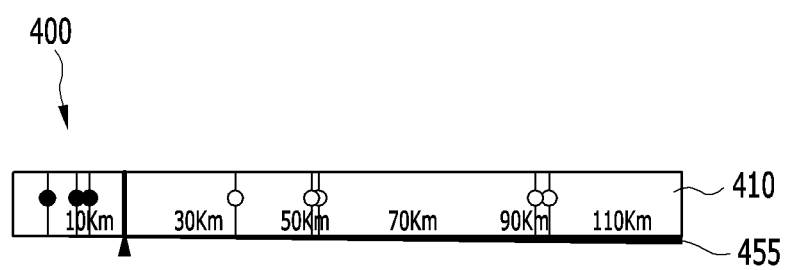
FIGS. 9A and 9B are diagrams illustrating an example in which the second display window is changed.
Figure 9B:
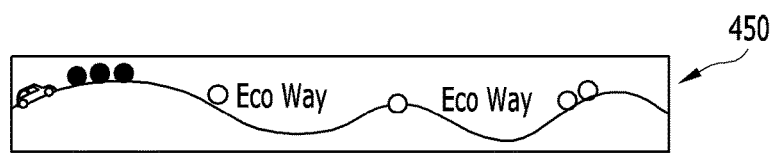

FIG. 8 is a flow chart of a change in a second display window in the charging station guide method, and FIGS. 9A and 9B are diagrams illustrating an example in which the second display window is changed.

Referring to FIG. 8, the control unit 150 outputs the image through the output unit 160 (S810). That is, the control unit 150 may display the image through the display unit 163 and output the sound signal for the image.

The control unit 150 confirms whether a change request of the second display window is input (S820). In other words, if after the driver touches the second display window and vertically and horizontally drags the touched second display window or selects a change object displayed on the second display window, the control unit 150 may confirm whether the change request of the second display window is input. Here, the change object may be an object for informing the driver that the second display window may be changed.

The control unit 150 changes the second display window if the change request of the second display window is input (S830). In other words, if the change request of the second display window is input from the driver, the control unit 150 may change the distance display window to the altitude display window or the altitude display window to the distance display window.

For example, as illustrated in FIG. 9A, the second display window 400 including the distance display window 410 and the change object 445 may be displayed on the display unit 163. In this case, the change object 445 may be positioned at a lower end of the distance display window 410.

Next, if the driver selects the change object 445, the control unit 150 confirms that the change request of the second display window 400 is input and as illustrated in FIG. 9B, the distance display window 410 of the second display window 400 may be changed to the altitude display window 450.

The exemplary form of the present disclosure may provide the charging station position information based on at least one of the map information, the distance information, or the altitude information, thereby improving the driver convenience.

Further, the information on the charging station depending on the driving direction of the vehicle is provided and therefore the driver may charge fuel in the vehicle without changing the driving direction.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A charging station guide apparatus, comprising:
   a global positioning system (GPS) configured to receive a GPS signal transmitted from a GPS satellite;
   a storage unit configured to store charging station information including map information and charging station position information;
   a control unit configured to generate a first display window including vehicle position information, the charging station position information, and a driving display region within a set angle range with respect to a driving direction of a vehicle, and configured to generate a second display window including charging station distance information and charging station altitude information, the control unit configured to generate an image so that the second display window overlaps with one end of the first display window; and
   a display unit configured to display the image generated from the control unit,
   wherein the control unit is configured to cause the second display window to render the charging station distance information on a distance display window when a charging station distance object is selected, and configured to cause the second display window to render the charging station altitude information on an altitude display window when a charging station altitude object is selected.

2. The charging station guide apparatus of claim 1, wherein the control unit is configured to determine the driving direction of the vehicle based on the vehicle position information, and the charging station position information includes a first position object representing a charging station positioned in the driving direction, and a second position object representing a charging station positioned out of the driving direction,
   wherein the altitude display window includes an eco way indication based on altitude information.

3. The charging station guide apparatus of claim 2, wherein at least one of sizes, colors, or forms of the first position object and the second position object are different from each other.

4. The charging station guide apparatus of claim 2, wherein the second display window includes a change object for switching between the distance display window and the altitude display window.

5. The charging station guide apparatus of claim 2, wherein when the second position object is selected, the control unit is configured to reset the driving display region to include the second position object.

6. The charging station guide apparatus of claim 1, wherein the control unit is configured to calculate a driving range using fuel amount information and average fuel efficiency, and the first display window further includes a driving display region representing the driving range.

7. The charging station guide apparatus of claim 1, wherein when a change request is input by a driver, the second display window is changed to the distance display window or the altitude display window.

8. The charging station guide apparatus of claim 1, wherein the distance display window further includes a selection object for selecting a charging station distance object among a plurality of charging station distance objects displayed on the distance display window.

9. The charging station guide apparatus of claim 1, wherein fuel of the vehicle is electricity or hydrogen, and the vehicle is driven by a driving motor using electric energy.

10. A method for guiding, by a charging station guide apparatus, a charging station, the method comprising:
    generating, by a control unit, a first display window including vehicle position information, charging station position information based on a GPS signal, map information, and charging station information, the first display window further including a driving display region within a set angle range with respect to a driving direction of a vehicle;
    generating, by the control unit, a second display window including charging station distance information and charging station altitude information;
    generating, by the control unit, an image including the first display window and the second display window;
    displaying, by a display unit, the image;
    causing, by the control unit, the second display window to render the charging station distance information on a distance display window when a charging station distance object is selected; and
    causing, by the control unit, the second display window to render the charging station altitude information on an altitude display window when a charging station altitude object is selected.

11. The method of claim 10, wherein the generating the first display window includes:
    determining, by the control unit, the driving direction based on the vehicle position information, and
    the charging station position information includes a first position object representing a charging station positioned in the driving direction and a second position object representing a charging station positioned out of the driving direction, and
    wherein the altitude display window includes an eco way indication based on altitude information.

12. The method of claim 10, wherein the second display window further includes a change object for switching between the distance display window and the altitude display window, and the method further comprises adjusting a scale of the first display window, when a charging station is selected on the first display window, to display a whole route from a current position of the vehicle to the selected charging station position.

13. The method of claim 12, further comprising resetting the driving display region to include the second position object, when the second position object is selected.

14. The method of claim 10, wherein the generating the first display window includes:
    calculating a driving range using fuel amount information and average fuel efficiency, and
    the first display window further includes a driving display region representing the driving range.

15. The method of claim 14, wherein a scale of the distance information of the second display window is changed depending on charging station setting number information or the driving range.

16. The method of claim 10, wherein the distance display window further includes a selection object for selecting a charging station distance object among a plurality of charging station distance objects displayed on the distance display window.

17. The method of claim 10, wherein when a change request is input by a driver, the second display window is changed to the distance display window or the altitude display window.

18. The method of claim 10, wherein in the generated image, the second display window overlaps with one end of the first display window.

* * * * *